(12) United States Patent
Ohtake et al.

(10) Patent No.: US 11,170,572 B2
(45) Date of Patent: Nov. 9, 2021

(54) SURFACE EXTRACTION METHOD AND APPARATUS FOR X-RAY CT VOLUME

(71) Applicants: THE UNIVERSITY OF TOKYO, Tokyo (JP); MITUTOYO CORPORATION, Kanagawa (JP)

(72) Inventors: Yutaka Ohtake, Tokyo (JP); Yukie Nagai, Tokyo (JP); Tomonori Goto, Hokkaido (JP); Seiji Sasaki, Saitama (JP); Masato Kon, Kanagawa (JP)

(73) Assignees: THE UNIVERSITY OF TOKYO, Tokyo (JP); MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/676,943

(22) Filed: Nov. 7, 2019

(65) Prior Publication Data

US 2020/0175758 A1 Jun. 4, 2020

(30) Foreign Application Priority Data

Nov. 30, 2018 (JP) .............................. JP2018-226040

(51) Int. Cl.
*G06T 17/20* (2006.01)
(52) U.S. Cl.
CPC ................................. *G06T 17/205* (2013.01)
(58) Field of Classification Search
CPC .................................................... G06T 17/205

USPC ......................................................... 345/419
See application file for complete search history.

(56) References Cited

U.S. PATENT DOCUMENTS

| 2019/0000564 A1* | 1/2019 | Navab .................... G06T 7/521 |
| 2020/0011662 A1 | 1/2020 | Ohtake et al. |
| 2020/0013200 A1 | 1/2020 | Ohtake et al. |

FOREIGN PATENT DOCUMENTS

| JP | 2002-071345 A | 3/2002 |
| JP | 2004-012407 A | 1/2004 |
| JP | 2018-040790 A | 3/2018 |

OTHER PUBLICATIONS

U.S. Appl. No. 16/661,206, Yusuke Goto et al., filed Oct. 23, 2019.

* cited by examiner

*Primary Examiner* — Shivang I Patel
(74) *Attorney, Agent, or Firm* — Greenblum & Bernstein, P.L.C.

(57) ABSTRACT

An isosurface mesh M is generated by extracting voxels having a certain CT value from volume data obtained by X-ray CT. A gradient vector g of a CT value is calculated at each vertex p of the isosurface mesh M. A plurality of sample points S are generated in positive and negative directions of the calculated gradient vector g. Gradient norms N of CT values at the respective generated sample points S are calculated. The vertex p of the isosurface mesh is moved and corrected to a sample point Sm having the maximum norm Nm calculated.

3 Claims, 6 Drawing Sheets

Fig. 1

PRIOR ART

PRIOR ART

SURFACE EXTRACTION METHOD AND APPARATUS FOR X-RAY CT VOLUME

CROSS-REFERENCE TO RELATED APPLICATION

The disclosure of Japanese Patent Application No. 2018-226040 filed on Nov. 30, 2018 including specifications, drawings and claims is incorporated herein by reference in its entirety.

TECHNICAL FIELD

The present invention relates to a surface extraction method and apparatus for X-ray CT volume. In particular, the present invention relates to a surface extraction method and apparatus for X-ray CT volume by which high-precision surface extraction robust to CT value fluctuations can be performed.

BACKGROUND ART

Medical X-ray CT apparatuses were put to practical use in the 1970s. On the basis of the technique, X-ray CT apparatuses intended for industrial products appeared in the early 1980s. Since then, industrial X-ray CT apparatuses have been used to observe and inspect voids in casting parts, welding defects in welded parts, and defects in circuit patterns of electronic circuit parts, which are difficult to identify from external appearance. In the meantime, the prevalence of 3D printers in recent years is boosting demand for not only observation and inspection inside workpieces produced by 3D printers but also 3D dimension measurement of internal structures and precision enhancement thereof.

In view of the foregoing technological trend, measurement X-ray CT apparatuses are becoming prevalent, especially, in Germany (see Japanese Patent Application Laid-Open Nos. 2002-71345 and 2004-12407). In such measurement X-ray CT apparatuses, an object to be measured is placed at the center of a rotating table, and X-ray irradiation is performed while rotating the object to be measured.

Figure 1:
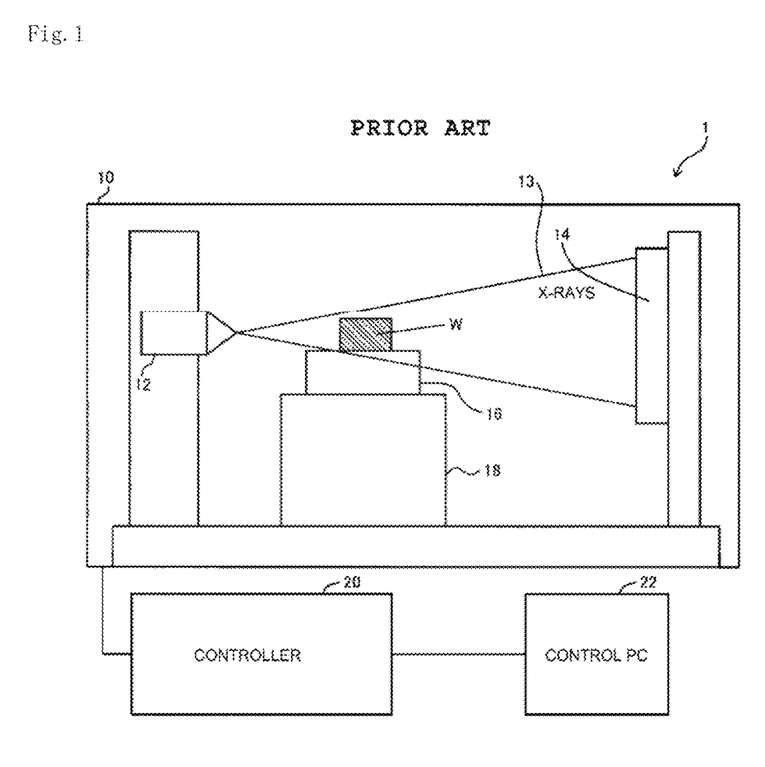
FIG. 1 is a sectional view showing an overall configuration of a typical X-ray CT apparatus used for measurement.

FIG. 1 shows a configuration of a typical X-ray CT apparatus 1 used for measurement. An X-ray source 12, an X-ray detector 14, a rotating table 16, and an XYZ moving mechanism unit 18 are accommodated in an enclosure 10 for blocking X-rays. The X-ray source 12 is configured to emit X-rays 13 in the form of a cone beam. The X-ray detector 14 is configured to detect the X-rays 13. An object to be measured (for example, work) W is placed on the rotating table 16. The rotating table 16 is configured to rotate the work W for CT imaging. The XYZ moving mechanism unit 18 is intended to adjust the position and magnification of the work W projected on the X-ray detector 14. The X-ray CT apparatus 1 further includes a controller 20 configured to control such devices, and a control PC 22 configured to give instructions to the controller 20 on the basis of user operations.

Aside from various device controls, the control PC 22 has a function of displaying a projection image of the work W projected on the X-ray detector 14, and a function of reconstructing a tomographic image from a plurality of projection images of the work W.

Figure 2:
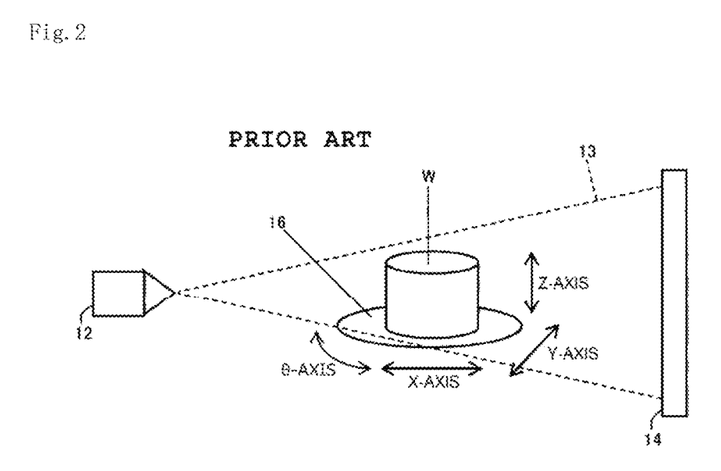
FIG. 2 is a perspective view showing an arrangement of essential parts of the same.

As shown in FIG. 2, the X-rays 13 emitted from the X-ray source 12 is transmitted through the work W on the rotating table 16 and reaches the X-ray detector 14. The X-ray detector 14 obtains transmission images (projection images) of the work W in all directions as the work W is rotated. A tomographic image of the work W is generated by reconstructing the projection images by using a CT reconstruction algorithm such as back projection and iterative reconstruction.

The position of the work W can be moved by controlling X-, Y-, and Z-axes of the XYZ moving mechanism unit 18 and a θ-axis of the rotating table 16. The imaging range (position and magnification) and imaging angle of the work W can thus be adjusted.

To obtain a tomographic image or volume data of the work W (stereoscopic image or a set of tomographic images of the work W in the Z-axis direction), which is the ultimate goal of the X-ray CT apparatus 1, a CT scan is performed on the work W.

Figure 3:
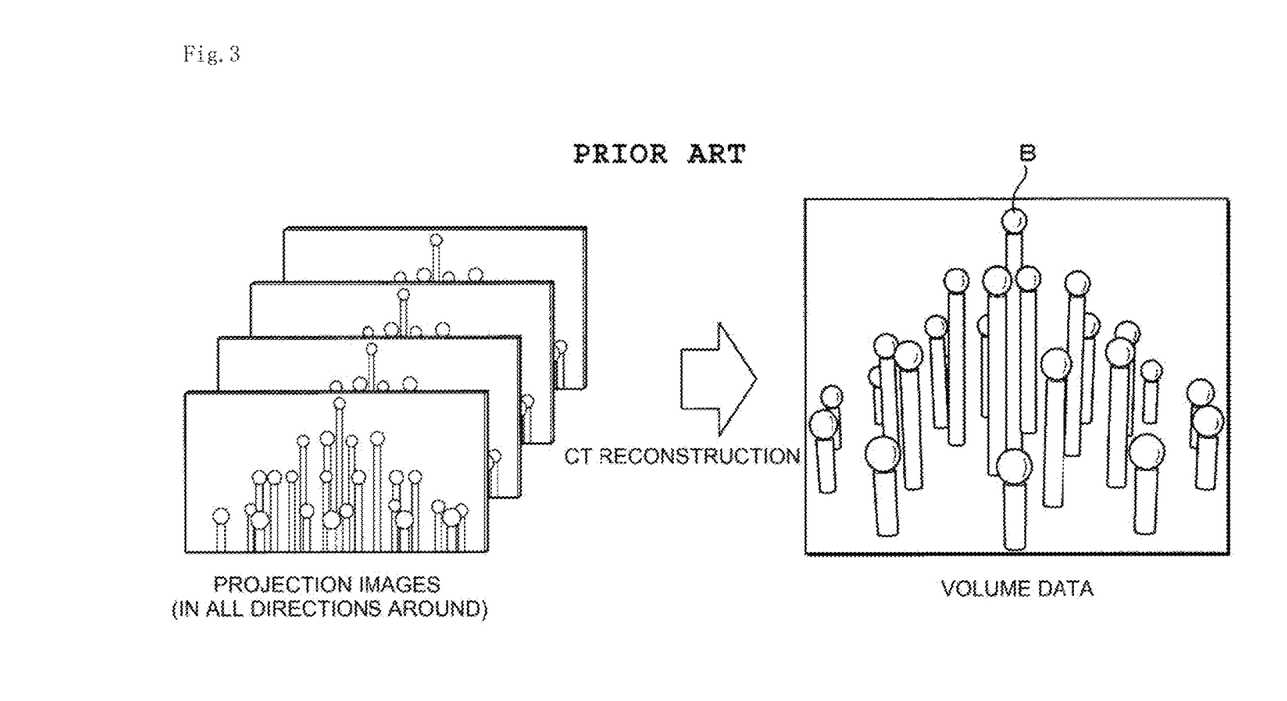
FIG. 3 is a diagram outlining CT reconstruction of the same.

The CT scan includes two processes, namely, acquisition of transmission images (projection images) of the work W and CT reconstruction. In the transmission image acquisition process, the rotating table 16 bearing the work W is continuously rotated at a constant speed or intermittently rotated in constant step widths during X-ray irradiation, whereby transmission images of the work W in all directions around (constant intervals) are obtained. CT reconstruction is performed on the obtained transmission images in all directions around (constant intervals) by using a CT reconstruction algorithm such as back projection and iterative reconstruction. A tomographic image or volume data of the work (in FIG. 3, master ball B) is thereby generated as illustrated in FIG. 3.

From the generated volume data, a mesh of a desired surface shape can be generated for evaluation and analysis (see Japanese Patent Application Laid-Open No. 2018-40790).

SUMMARY OF INVENTION

Technical Problem

Among the basic methods for generating a mesh of a surface shape from volume data is a method for extracting voxels having a certain CT value to generate a mesh (isosurface mesh generation). A surface shape in volume data typically includes fluctuations in CT values due to artifacts (noise). Since the method is directly affected by CT value fluctuations due to artifacts and the like, there has been a problem that the surface shape cannot be precisely extracted from only an isosurface that determines a surface with a certain CT value.

The present invention has been made in order to solve the foregoing conventional problem, and an object thereof is to perform high-precision surface extraction robust to CT value fluctuations.

Solution to Problem

The prevent invention solves the foregoing problem by, during surface extraction on X-ray CT volume, extracting voxels having a certain CT value from volume data obtained by X-ray CT to generate an isosurface mesh, and correcting each vertex of the isosurface mesh using gradient information about a CT value at the vertex of the isosurface mesh.

The vertex of the isosurface mesh may be corrected by calculating a gradient vector of the CT value at the vertex, generating a plurality of sample points in positive and negative directions of the calculated gradient vector, calculating gradient norms of CT values at the respective generated sample points, and moving the vertex to a sample point having the maximum gradient norm calculated.

The CT value at the vertex may be calculated by using following equation according to a Feldkamp method.

$$f(p)=½\int_0^{2\pi}\alpha(\theta,p)^2 S^{filtered}(\theta,p)d\theta \qquad (1),$$

where the coefficient $\alpha(\theta, p)$ equals to $d_{sod}/(d_{sod}+d_z)$,
$\theta$ is a rotation angle,
$d_{sod}$ is a light-source-to-rotation-center distance, and
$S^{filtered}(\theta, p)$ is a filter-corrected projection value (using Shepp-Logan filter).

The present invention provides a surface extraction apparatus for X-ray CT volume for performing surface extraction on X-ray CT volume, the surface extraction apparatus for X-ray CT volume including: a unit configured to extract voxels having a certain CT value from volume data obtained by X-ray CT to generate an isosurface mesh; and a unit configured to correct each vertex of the isosurface mesh by using gradient information about a CT value at the vertex of the isosurface mesh.

The unit configured to correct the vertex of the isosurface mesh may include: a unit configured to calculate a gradient vector of the CT value at the vertex; a unit configured to generate a plurality of sample points in positive and negative directions of the calculated gradient vector; a unit configured to calculate gradient norms of CT values at the respective generated sample points; and a unit configured to move the vertex to a sample point having the maximum gradient norm calculated.

Advantageous Effects of Invention

According to the present invention, high-precision surface extraction can be performed by correcting the isosurface mesh using the gradient information about the CT values.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DESCRIPTION OF EMBODIMENTS

An embodiment of the present invention will be described in detail below with reference to the drawings. The present invention is not limited by the following description of the embodiment and examples. The components of the embodiment and examples described below include what are easily conceivable by those skilled in the art, what are substantially the same, and what fall within a so-called range of equivalence. The components disclosed in the following embodiment and examples may be combined as appropriate or selectively used as appropriate.

An algorithm according to the present invention handles volume data generated by X-ray CT as an input, and surface-extracted mesh data as an output.

Figure 4:
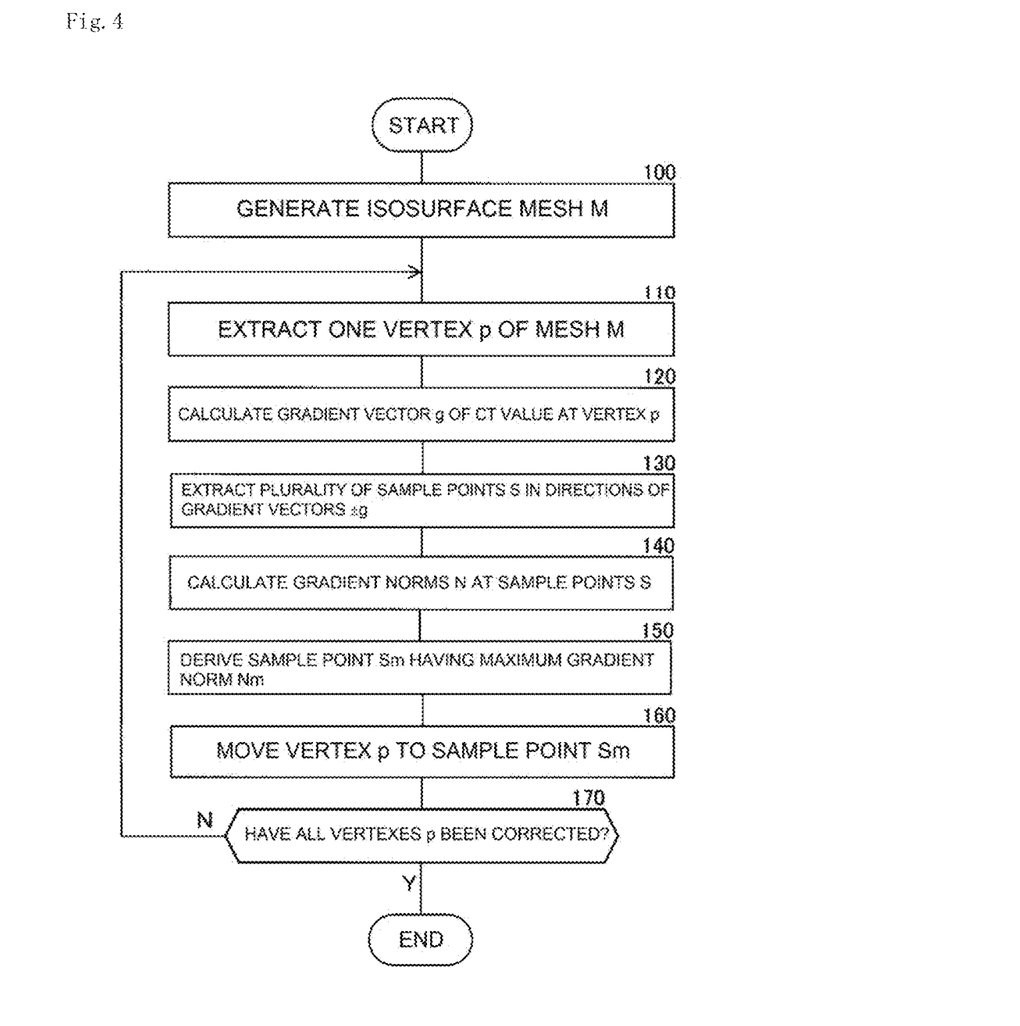
FIG. 4 is a flowchart showing a processing procedure according to an embodiment of the present invention.

FIG. 4 outlines a processing procedure according to the embodiment of the present invention.

In step 100, an isosurface mesh M is initially generated from the volume data.

Each voxel of the volume data has a CT value. An isosurface mesh can be generated by extracting voxels having a certain CT value. The CT value can be selected by a method of checking a histogram of CT values of the volume data for selection. The histogram typically includes peaks representing respective work materials and air. For example, to extract the external surface of the work (interface between air and the work), an intermediate value (CT values) between the peaks representing air and the material of the external surface of the work in the histogram is selected. An isosurface mesh is generated by using the selected appropriate CT value corresponding to a desired surface shape in the volume data.

In step 110, a vertex p constituting the mesh M is extracted.

In step 120, a gradient vector g at the extracted mesh vertex p is calculated. The gradient vector g can be calculated in the following manner.

Figure 5:
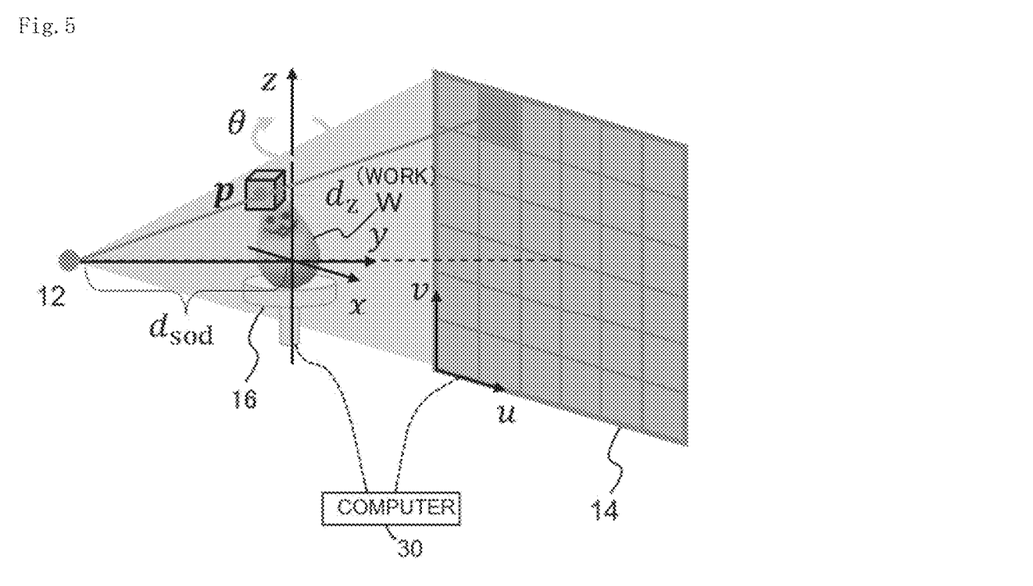
FIG. 5 is a perspective view for describing an example of a method for analytically calculating a CT value gradient according to the embodiment.

Initially, using the Feldkamp method (FDK method) which is one of the commonly used back projection methods, a CT value f(p) at the vertex p(x, y, z) is calculated by the following equation (see FIG. 5):

$$f(p)=½\int_0^{2\pi}\alpha(\theta,p)^2 S^{filtered}(\theta,p)d\theta \qquad (1),$$

where the coefficient $\alpha(\theta, p)$ equals to $d_{sod}/(d_{sod}+d_z)$,
$\theta$ is a rotation angle,
$d_{sod}$ is a light-source-to-rotation-center distance, and
$S^{filtered}(\theta, p)$ is a filter-corrected projection value (using Shepp-Logan filter).

In FIG. 5, the reference numeral 30 represents a computer that performs the calculation.

Aside from the Shepp-Logan filter, the filter-corrected projection value can be determined by using the Ram-Lak filter or the Kak-Slaney filter.

Next, the gradient vector g(p) of the CT value at the point p(x, y, z) is generated by the following equation:

$$g(p) \simeq \frac{1}{2}\int_0^{2\pi}\alpha(\theta,p)^3 R_{-\theta}\left(\frac{\theta}{\partial(u,v)}S^{filtered}(\theta,p),0\right)^r d\theta, \qquad (2)$$

where $R_{-\theta}$ is a three-dimensional rotation matrix for angle $-\theta$, and
$\partial/\partial(u, v)$ is derivative in the detector coordinate system (calculation of center difference between filter-corrected projection values).

Here, an assumption of $\alpha(\theta, p)=\alpha(\theta)$ ($\alpha$ is independent of p) can be employed for simplification of calculation.

Points p are treated as continuous values. In calculating projection values, interpolation processing is performed as appropriate.

Figure 6:
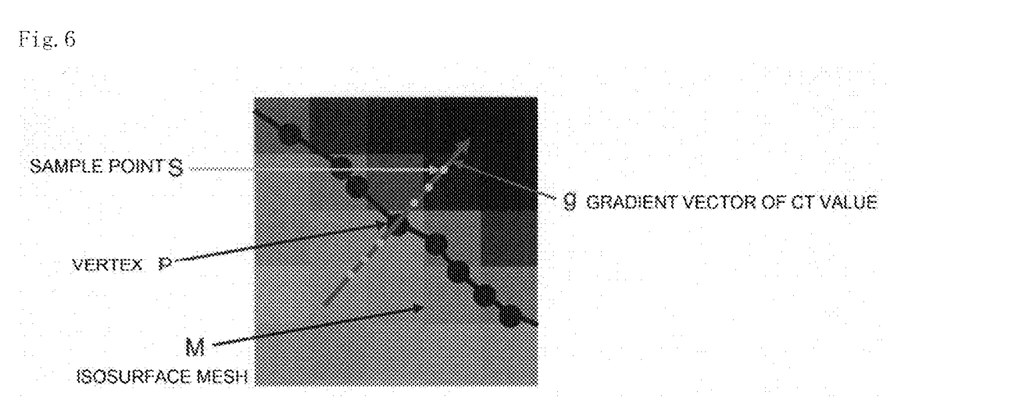
FIG. 6 is a diagram showing an example of a plurality of sample points extracted in the directions of gradient vectors ±g according to the embodiment.

In step 130, as shown in FIG. 6, a plurality of sample points S are extracted on the gradient vectors ±g passing through the mesh vertex p. The extraction range and extraction intervals may be freely set, for example, with reference to the voxel size. For example, the sampling range (extraction range) can be set to ±4 voxels or so. The sampling intervals (extraction intervals) can be set to around 0.1 to 0.2 times the voxel size.

Figure 7:
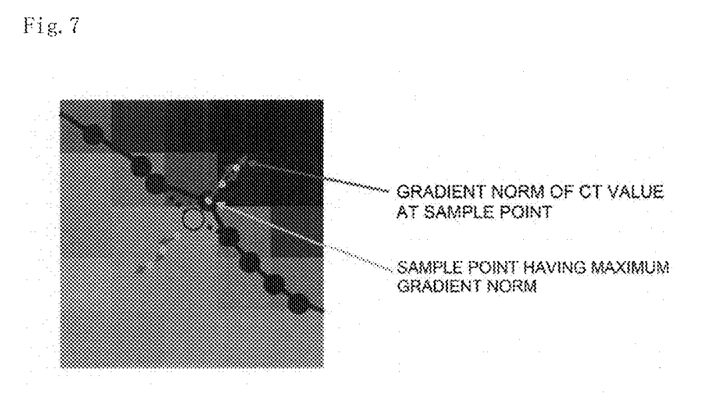
FIG. 7 is a diagram showing how a vertex is moved to a sample point according to the embodiment.

In step 140, as shown in FIG. 7, gradient norms N at all the extracted sample points S are calculated from the absolute values of the gradient vectors g by the following equation:

$$N=|g(S)| \quad (3)$$

In step 150, a sample point Sm having the maximum value Nm among the gradient norms N at the sample points S is derived.

In step 160, the vertex p is moved to the sample point Sm. The reason is that the sample points S deviate greatly at the interface between the work and air or at the interface between different work materials.

After step 160, the processing proceeds to step 170. In step 170, whether all the vertices p have been corrected is checked.

If all the vertices p have not been corrected, the processing returns to step 110 to correct the next vertex p.

On the other hand, if, in step 170, all the vertices p are determined to have been corrected, the processing ends.

Figure 8:
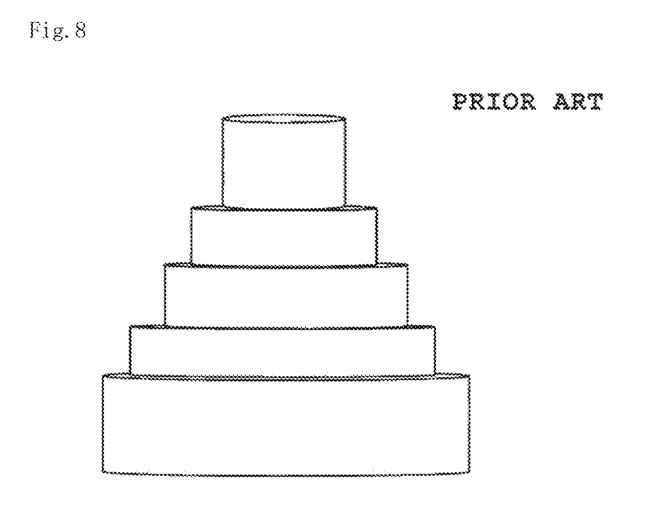
FIG. 8 is a perspective view showing a step cylinder that is an example of an object to be measured.

The inventors made a simulation to evaluate measurement values of a step cylinder such as illustrated in FIG. 8, with an outer diameter of 20 mm at the first stage and an outer diameter of 60 mm at the fifth stage. A conventional isosurface mesh method produced particularly large errors at the first and second stages. According to the present invention, the errors at the first and second stages were successfully reduced by half.

The master ball B, or ruby ball, illustrated in FIG. 3 was also evaluated. By the conventional method, a difference between the actual measurement of the diameter of the ball and the diameter obtained by fitting was 8 to 9 μm. According to the method of the present invention, the difference was successfully reduced to 0 to 2 μm. A similar tendency was observed for all the balls.

In the present embodiment, the use of the FDK method facilitates obtaining the derivative of the equation for determining the CT value, whereby gradient information about the CT value can be easily obtained. The method for obtaining the gradient information about the CT value is not limited to the FDK method.

In the foregoing embodiment, the gradient information is gradient norms. However, the gradient information is not limited thereto. The object to be measured is not limited to a work, either.

It should be apparent to those skilled in the art that the above-described exemplary embodiments are merely illustrative which represent the application of the principles of the present invention. Numerous and varied other arrangements can be readily devised by those skilled in the art without departing from the spirit and the scope of the invention.

The invention claimed is:

1. A surface extraction method for X-ray Computed Tomography (CT) volume, comprising:
   extracting voxels having a certain CT value from volume data obtained by X-ray CT to generate an isosurface mesh; and
   correcting each vertex of the isosurface mesh using gradient information about a CT value at the vertex of the isosurface mesh to remove artifacts from a resultant CT image,
   wherein the vertex of the isosurface mesh is corrected by
      calculating a gradient vector of the CT value at the vertex,
      generating a plurality of sample points in a positive direction and a plurality of sample points in a negative direction of the calculated gradient vector,
      calculating gradient norms of CT values at the respective generated sample points, and
      moving the vertex to a sample point having a maximum gradient norm calculated, and
   wherein the plurality of sample points in the positive direction and the plurality of sample points generated in the negative direction are generated at predetermined intervals.

2. The surface extraction method for X-ray Computed Tomography (CT) volume according to claim 1,
   wherein the CT value at the vertex is calculated by using following equation according to a Feldkamp method, $$f(p)=\tfrac{1}{2}\int_0^{2\pi}\alpha(\theta,p)^2 S^{filtered}(\theta,p)d\theta \quad (1),$$

where the coefficient $\alpha(\theta, p)$ equals to $d_{sod}/(d_{sod}+d_z)$,
   $\theta$ is a rotation angle,
   $d_{sod}$ is a light-source-to-rotation-center distance, and
   $S^{filtered}(\theta, p)$ is a filter-corrected projection value (using Shepp-Logan filter).

3. A surface extraction apparatus for X-ray Computed Tomography (CT) volume for performing surface extraction on X-ray CT volume, the surface extraction apparatus for X-ray CT volume comprising:
   a processor; and
   a memory that stores a program therein, which when the program is executed by the processor, causes the processor to perform CT operations, including
      extracting voxels having a certain CT value from volume data obtained by X-ray CT to generate an isosurface mesh, and
      correcting each vertex of the isosurface mesh by using gradient information about a CT value at the vertex of the isosurface mesh to remove artifacts from a resultant CT image,
   wherein the correcting each vertex of the isosurface mesh includes
      calculating a gradient vector of the CT value at the vertex,
      generating a plurality of sample points in a positive direction and a plurality of sample points in a negative direction of the calculated gradient vector,
      calculating gradient norms of CT values at the respective generated sample points, and
      moving the vertex to a sample point having the maximum gradient norm calculated, and
   wherein the plurality of sample points in the positive direction and the plurality of sample points generated in the negative direction are generated at predetermined intervals.

* * * * *

UNITED STATES PATENT AND TRADEMARK OFFICE
CERTIFICATE OF CORRECTION

PATENT NO. : 11,170,572 B2
APPLICATION NO. : 16/676943
DATED : November 9, 2021
INVENTOR(S) : Yutaka Ohtake et al.

Page 1 of 1

It is certified that error appears in the above-identified patent and that said Letters Patent is hereby corrected as shown below:

In the Specification

In Column 2, Line 9, the expression "0-axis" should read -- $\theta$-axis --.

In Column 3, Lines 3-4, the expression "using following" should read -- using the following --.

In Column 4, Line 60, the expression "$\partial/\partial(u,v)$" should read -- $\partial(u,v)$ --.

In the Claims

In Column 6, Lines 24-25 (Claim 2, Lines 3-4), the expression "using following" should read -- using the following --.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*